Figure 4:
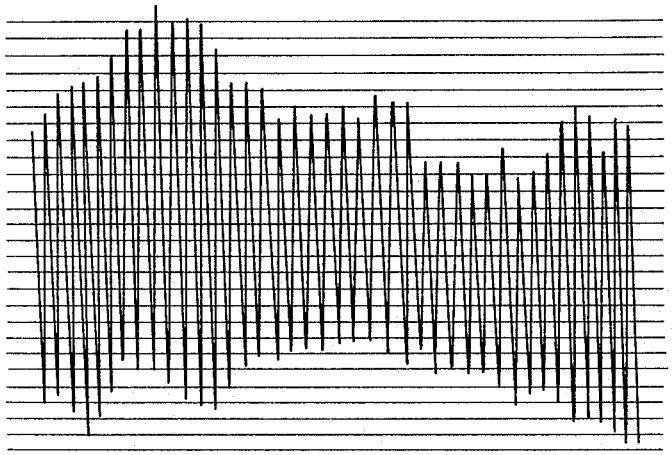

Oct. 25, 1966  G. A. WEINERT  3,280,624
DYNAMIC GEAR NOISE LEVEL ANALYZER
Filed May 28, 1964  2 Sheets-Sheet 1
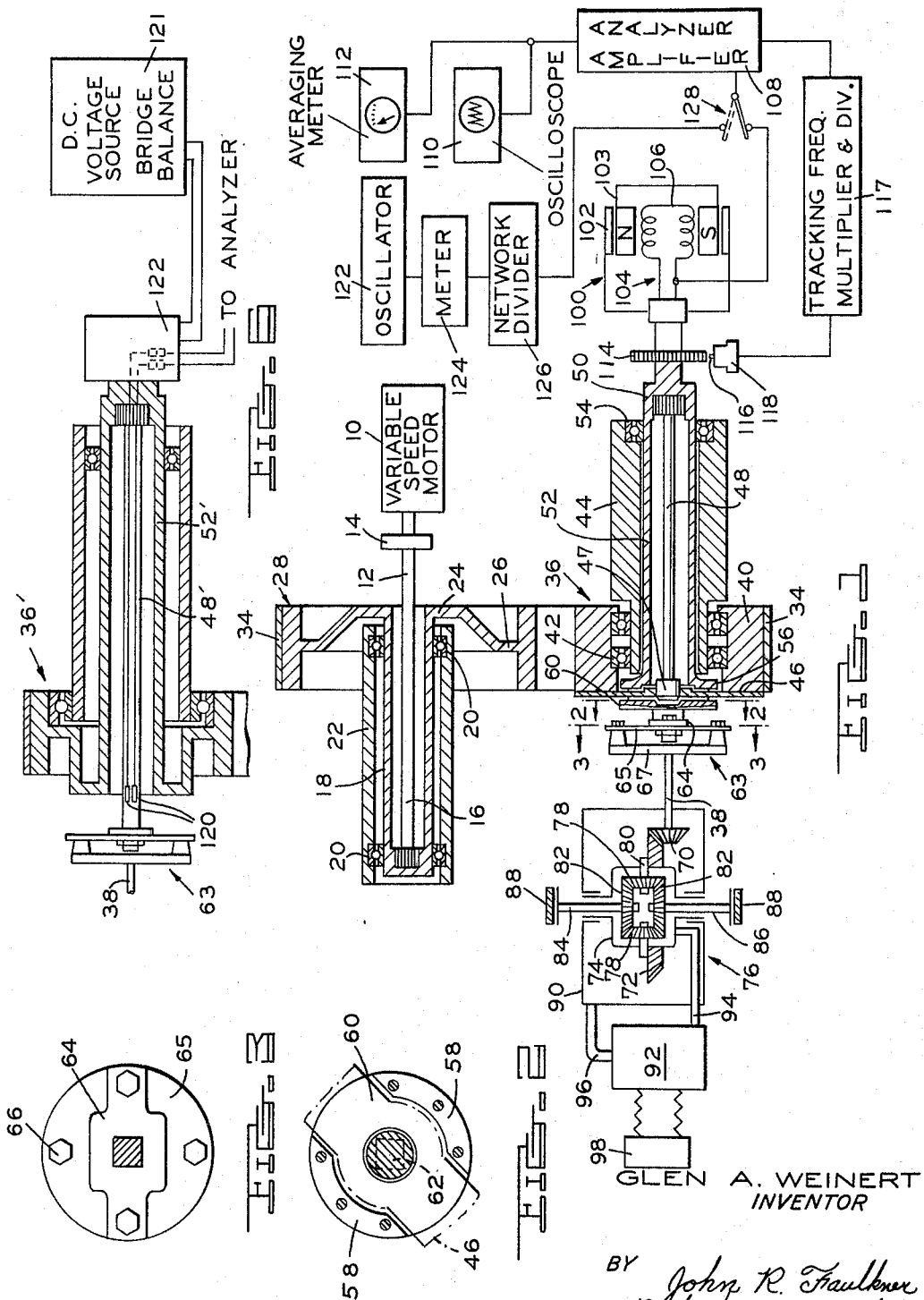
GLEN A. WEINERT
INVENTOR
BY John R. Faulkner
Robert E. McCollum
ATTORNEYS

GLEN A. WEINERT
INVENTOR

BY John R. Faulkner
Robert E. McCollum
ATTORNEYS

United States Patent Office

3,280,624
Patented Oct. 25, 1966

3,280,624
DYNAMIC GEAR NOISE LEVEL ANALYZER
Glen A. Weinert, Detroit, Mich., assignor to Ford Motor Company, Dearborn, Mich., a corporation of Delaware
Filed May 28, 1964, Ser. No. 370,785
10 Claims. (Cl. 73—162)

This invention relates to an apparatus for quickly checking and positively determining the noise level of a rotating set of so-called constant velocity ratio gears. More particularly, it relates to an apparatus for dynamically analyzing the motion of such a set of gears to determine whether or not the set is rotating with conjugate action.

One of the major factors contributing to the noise level and wear of a passenger car rear axle, for example, has been the nonconjugate action or mismatch in gear tooth contact between the differential pinion and ring gear. The so-called constant velocity ratio gearset in use today is actually a misnomer since it is almost impossible to find a commercial gearset of this type that rotates with a constant ratio of angular motion. If it were possible to manufacture such a gearset, the gears would have a tooth contact pattern that would provide conjugate action when the gears are rotated. This would eliminate a major source of mechanical vibration that causes noise to be transmitted to the vehicle driver. However, due to the changes that take place in the shape of the gear teeth during the various finishing steps involved in their manufacture, the teeth rarely conform to design. As a result, the slight mismatch between the gear teeth as they are rotated together causes a harmonic vibration to be induced during each revolution of the gears. At certain speed levels, this produces a distinct tone or whine that is irritating to an occupant of the motor vehicle.

At the present time, the manufacturers of these constant velocity ratio gearsets, such as the rear axle pinion and ring gears mentioned, generally provide a dynamic check of these gearsets prior to their installation in a motor vehicle. Prior to this invention, this check consisted primarily of an operator, with a so-called tuned ear, spinning the set of gears and listening for any noise that the gearset made. If it was unusually noisy, i.e., unpleasant to his ear, it was rejected. If not, it was approved. This primitive method of detection has quite widespread use. It is obvious that there can be a wide divergence of opinion between operators as to whether an axle gearset is noisy or not.

This invention provides an apparatus for positively checking the noise level of a constant velocity ratio gearset by accurately measuring the effect of the conjugate error, or deviation from constant ratio of angular motion. It provides a quick and accurate check by an operator in the factory of the sound pressure of any rear axle gearsets, for example, of the same basic design. It enables an operator to install in a test fixture a gearset that has substantially a constant ratio of angular motion, and in a matter of seconds, determine whether or not the gearset is acceptable from a noise standpoint, as compared to other similarly designed gearsets or to a calibrated gearset that has a known conjugation error.

More particularly, the invention provides an apparatus that rotates the test gearset at a constant speed and torque. If conjugate error exists between the meshing gear teeth, it will show up in the form of an acceleration or deceleration of one of the gears relative to the constant input shaft speed. This produces a particular harmonic torsional vibration for each tooth during each revolution of the gears. These particular vibrations, as well as all the vibrational disturbances that arise for other reasons, are detected by either a velocity, acceleration, angular displacement, or torque sensitive pickup device that then produces a voltage at the tooth frequency that is proportional to the level of conjugate error. The pickup relays this voltage to an analyzer that is generally tuned only to the particular order of harmonic vibrations that are caused by the error in conjugate action. This harmonic signal is then amplified and fed to a visual indicating means such as an oscilloscope and an averaging meter that can be checked by an operator. The averaging meter has a reference gearset noise level value determined originally in one of two ways; either by previously analyzing a constant velocity ratio gearset of the same basic design; or, by reference to the velocity number of a calibrated gearset, that is, one that has a measured amount of conjugate error. The velocity number is a linear value that describes the magnitude of the vibration with which we are concerned, and, therefore, is suitable as a base with which we can compare the test gearsets and predict sound pressure that will emanate from them.

It is, therefore, one of the objects of the invention to provide an apparatus for determining the potential noise level of a supposedly constant velocity ratio gearset.

It is another object of the invention to provide an apparatus permitting a quick check to be made of the noise level of a nominally constant velocity ratio gearset by driving the gears at substantially a constant speed and torque, sensing any deviation of the gears from constant angular motion, and translating this deviation into a visual and measurable signal.

Figure 5:

Other objects, features, and advantages of the invention will become apparent upon reference to the succeeding, detailed description thereof, and to the drawings illustrating the preferred embodiments thereof; wherein, FIGURE 1 shows, schematically, one apparatus embodying the invention;

FIGURES 2 and 3 are cross-sectional views taken on planes indicated by and viewed in the direction of arrows 2—2 and 3—3 of FIGURE 1;

FIGURES 4 and 5 are diagrammatic representations of wave patterns caused by the nonconjugate action of different gearsets; and, FIGURE 6 is a schematic illustration of a modification.

FIGURE 1 shows one system for determining and recording the noise level of a constant velocity ratio gearset. It includes a variable speed direct current motor 10 that drives one end of a relatively long shaft 12. A torque meter 14 is secured to shaft 12, although it may be omitted, if desired. The opposite end 16 of shaft 12 is splined to one end of a torque tube 18 that is rotatably mounted by bearings 20 on a stationary portion of a support 22. The opposite end of tube 18 has a radial flange 24 fixed to the web 26 of a driving pulley 28. The pulley is rotatably supported on bearings 30 mounted in support 22.

The described connections provide a torsion bar type of drive of pulley 28 by motor 10, and thus provide a low mechanical impedance system that absorbs the motor vibrations. Any torsional vibrations that are transmitted to shaft 12 are absorbed by the flexible shaft 12 and not transmitted to pulley 28.

An endless belt 34 frictionally engages the periphery of pulley 28 and a driven second pulley 36. Pulley 36 is adapted to drive a pinion gear shaft 38 through a torsion bar connection similar to that provided between motor 10 and pulley 28. That is, pulley 36 has a body portion 40 that is rotatably mounted on bearings 42 secured in a stationary support 44. The pulley is secured to a radially extending drive plate 46 that is splined on the squared shank end 47 of a relatively long shaft 48. The opposite end of this shaft is splined to the end 50 of a similarly long torque tube 52. The tube is rotatably mounted on support 44 by bearing 54, and extends forwardly to a point adjacent the drive plate 46.

As best seen in FIGURES 1 and 2, the tube has an annular flange 56 that is bolted to spaced bosses 58 that straddle the drive plate 46 and are connected to an annular plate 60. The plate or disc has a square shank portion 62 that is connected to shaft 38 by means of a soft coupling 63. The soft coupling not only permits a slight misalignment of shafts 47 and 38, but prevents transmission past the coupling of any vibrations due to the manner in which the gearset is mounted and the differential case held.

Coupling 63 comprises a substantially rectangular plate 64 (FIGURE 3) fixed on the square shank 62 of disc 60, and bolted at its ends to two diametrically opposite portions of a thin flexible disc 65. This thin disc in turn is bolted at its two remaining portions 66 to an annular drive plate 67 secured to shaft 38. A test rear axle pinion gear 70 is fixed on the end of shaft 38.

The pinion gear is in constant mesh with a ring gear 72 fixed to the cage 74 of a differential gearset 76. This gearset is of a known type, and includes end bevel gears 78 rotatably mounted on pins 80 fixed in the cage or carrier 74. The gears 78 mesh with side bevel gears 82 each separately connected to a shaft 84 and 86. A brake band or other suitable brake means 88 is provided adjacent each of the shafts 84 and 86 so that a load can be applied to the shafts to simulate actual operating conditions; that is, as if the motion of the shafs were resisted by the engagement of vehicle tires with the ground. The brake would be of a construction so as not to induce torsional vibrations into the system.

The differential gearset 76 is enclosed by a stationary housing 90. Since it is desired to simulate the noise level that would occur under normal operating conditions of a motor vehicle, the oil normally used to lubricate the gearset is preheated to a temperature approximating that of the level that would be obtained during normal cruising conditions of operation of the motor vehicle. For this purpose, a lubrication sump 92 has a pump (not shown) supplying oil or other suitable lubricant through a tube 94 to the differential gearset, a line 96 returning the oil to the sump. The sump is electrically connected to a heater 98 that automatically maintains the temperature of the oil in the sump in the neighborhood of 175° F.

With the arrangement as described, rotation of shaft 12 by motor 10 is transmitted through pulleys 28 and 36 and coupling 63 to shaft 38 to drive the gears 70 and 72 at a constant speed ratio, say, for example 3 to 1. As stated previously, the torsion bar connections between the motor and the two pulleys and soft coupling provide a low mechanical impedance system to isolate any torsional vibrations that may be induced by the drive per se or by the mounts of the various parts, so that the torque delivered to shaft 38 will be, essentially, a constant one.

If the gears 70 and 72 were a perfectly matched set, they would rotate with a constant angular motion, and conjugate action would, therefore, exist. However, such a case is rare due to the fact that the shape of the finished gear teeth vary slightly from design because of changes that occur in the tooth geometry during the manufacturing processes. As a result, the gears 70 and 72 generally do not mate perfectly due to one or the other of the gear teeth surfaces having off-design irregularities. This provides a relative conjugation error that causes the pinion gear, for exampel, to constantly accelerate or decelerate with respect to the speed of shaft 14.

This conjugation error is one of the major factors contributing to the noise level of a nominally constant velocity ratio gearset. Other factors also indirectly contribute to this noise level, such as, for example, the distortion associated with the retaining holes in the ring gear, and the eccentricities of the pinion and ring gears. However, it has been found that the noise level attributable to the gear tooth conjugate error provides the greatest annoyance, and is most discernible.

If the finished gear teeth mating surfaces are off-design, each rotation of each tooth on the pinion into contact with a tooth on the ring gear will produce an impulse or torsional vibration. That is, assume, for example, that the tooth surface of one or the other of the gears is higher or lower than it should be. As the tooth rotates, this tooth form error causes a point on the tooth to speed up or slow down in velocity relative to the velocity of the input shaft. This velocity differential can be accurately checked by measuring the torque level or velocity differential between the pinion gear and the input shaft. Since the polar moment of inertia of the ring gear is, say, approximately ten times as great as that of the pinion gear, the pinion gear will have the smallest resistance to a change in angular displacement, and therefore, will be the gear that accelerates or decelerates due to the errors in tooth geometry. The torsional vibration caused by the velocity or torque differential is directly related to sound pressure, and the magnitude of the sound pressure is proportional to noise level; therefore, the torsional vibration level due to conjugate error at any particular speed of the gearset will provide a measure of the potential noise level of a particular gearset.

The conjugate error between gears 70 and 72, as evidenced by the deviation of the level of torque or velocity of shaft 38 from the constant input shaft torque and speed, is detected in this embodiment by an electrical velocity or torque pickup device 100 secured to the end 50 of torque tube 52. Other suitable velocity pickups, acceleration, torque or displacement transducers, of course, could be used. The pickup shown is of a type that will convert the mechanical vibrations of the gearset into an electrical voltage that can be amplified and recorded by an oscilloscope, for example.

The complete details of construction of the pickup are not given since they are known and believed to be unnecessary for an understanding of the invention. Suffice it to say, however, that the pickup would have, for example, an outer housing 102 that is fixed for rotation with the torque tube 52. It is magnetically coupled to a field magnet 103 having north and south poles, as indicated, that rotates around a core 104 that is also fixed to the end of torque tube 52. The core would carry a coil 106. Due to the magnetic coupling between the housing and the field magnet, the magnet would rotate at the average speed of the torque tube 52. The coil 106, however, is instantaneously responsive to the torsional fluctuations of the torque tube 52, and, therefore, responds immediately to the change in speed of the pinion gear 70. Therefore, relative motion between the magnet and coil caused by the torsional variation between the two then develops a voltage in the coil that is proportional to the angular velocity differential. That is, the accelerations and decelerations of the pinion gear relative to the constant speed of shaft 12 is sensed by the pickup, which develops a voltage proportional to the change.

The pickup, therefore, not only senses the particular harmonic vibrations caused by the gear tooth conjugate error at a given speed, but all of the torsional vibrational disturbances existing for various reasons in the gearset system at a given speed. This developed voltage is then fed into a conventional combination analyzer and amplifier 108 that is tuned to pick up the vibrations caused by the nonconjugate action of the gearing. The analyzer, therefore, separates out this particular harmonic order, and amplifies it to, say, ten times its normal strength. This amplified signal is then fed into an oscilloscope 110, which visually indicates the wave pattern due to this conjugate error for all the teeth of the gear. That is, if there are 39 teeth on the ring gear, there will be 39 waves for each revolution of the gear, as shown in FIGURE 4. The wave pattern thus furnishes a visual indication of the intensity and uniformity of the conjugation error from tooth to tooth. Compare, for example, the signal shown in FIGURE 4 to that shown in FIGURE 5. The FIGURE 4 gearset has a wave pattern of large amplitudes, indicating large conjugate error; and, logically, is considered a noisy gearset. FIGURE 5 illustrates the wave pattern for a quiet gearset.

Finally, an averaging meter 112 of a known type is used to average the amplitudes shown on the oscilloscope 110 and transform them into a single velocity number that can be compared either to the velocity number of a calibrated reference axle, or can itself be used as a reference number against which other differential gearsets of the same basic design can be compared. That is, by suitable calculation, the conjugation error for a gearset of the same basic design can be obtained. As stated previously, the velocity number is a number whose magnitude is directly related to the rotating vector that describes vibration. The velocity number is also proportional to a component of the voltage of pickup 100 and directly related to sound pressure. Therefore, the wave pattern shown on oscilloscope 110 shows the amplitude related to the dynamic velocity numbers associated with the conjugate errors of the teeth of the gearset in question. The averaging meter 112 enables us to obtain a single velocity number. The scale of the averaging meter can, therefore, be calibrated to read conjugation error or sound pressure, and all axle sets of the same basic design can then be compared with it. If the test gearset provides a high velocity number on the averaging meter, it will be a noisy axle, and should be rejected.

In the above illustration, the analyzer 108 described is tuned to pick out the desired harmonic order at a particular frequency. In order to render the apparatus adaptable for slight variations in frequency at any set speed of rotation, a tracking analyzer can be substituted in its place. To accomplish this, a disc 114 is secured to torque tube 52, the disc having, for convenience, say, ten equally spaced notches or flats that are adapted to be sensed in sequence by a stationary pickup 118. The pickup senses the speed of the torque tube, and feeds this information to a tracking frequency multiplier and divider 117, which then supplies a tuning signal input to the analyzer 108. The tracking frequency multiplier thus automatically tunes the analyzer 108 to the correct frequency. With this setup, therefore, the motor can be set to run at any speed, and even though fluctuations occurred, the exact frequency of the vibrations due to conjugate error at that speed can be picked up.

An alternate arrangement is shown in FIGURE 6 for sensing the gearset conjugate error by means of strain gauges. They would include resistance-sensitive wire elements 120, for example, that follow the strain variations of the pinion gear shaft, i.e., the amount it is torsionally stretched due to the conjugate error. In this embodiment, the driven pulley 36' is connected directly to one end of the torque tube 52', which is splined at its opposite end to a shaft 48'. The shaft in turn is secured by the soft coupling 63 to the pinion gear shaft 38. The pair of strain gauges 120 are located in the shaft and electrically connected to a Wheatstone bridge type of circuit 121 to a pair of slip rings enclosed by a housing 122 mounted on an extension of torque tube 52'. The stretch of the strain gauges due to twisting of the shaft 48' relative to the torque tube 52', because of the mechanical vibrations of the gearset, changes the resistances across the Wheatstone bridge and produces a voltage proportional to the conjugate error. This voltage is picked up by the analyzer, which then feeds it to the oscilloscope and averaging meter as before.

In both of the embodiments described, a calibrating system of a known type generally is included so that the analyzer 108, oscilloscope 110, and averaging meter 112 can be checked or calibrated before each run, if desired. Thus, any error due to malfunction of these elements per se can be detected. This calibration system includes, for example, an oscillator 122 providing a voltage to a meter 124 that will measure the voltage, and a dividing network 126 that divides this voltage down to a low signal of say, .010 volt, for example, that is suitable to be received by the analyzer. The electrical connection to the analyzer would include a double-throw switch 128 between the analyzer and the pickup and calibration circuit so that analyzer can be connected independently to either circuit.

The over-all operation of both embodiments of the invention is believed to be clear from the description given. Briefly, however, when a gearset is to be checked, it is secured in position, and motor 10 set at a chosen speed, say, at 1200 r.p.m., for example, to provide a constant speed to shaft 38. The brakes 88 are also adjusted to provide a desired torque level. If the gearset deviates from constant angular motion, the pinion gear, which has a lower polar moment of inertia than the ring gear, will constantly accelerate and decelerate relative to the speed of the motor shaft and pulley 36, thus inducing a particular harmonic impulse to the system for each revolution of the shaft. This velocity deviation, as well as all of the disturbances due to various causes, will be picked up by the velocity pickup 100 as a torsional velocity. The relative motion between the parts of the pickup will then develop a voltage to the analyzer 108, one component of which is proportional to the level of conjugate error of the gearset. The analyzer will automatically be tuned to pick out the harmonic vibration due to the nonconjugate action of the gear teeth, and feed this signal to both the oscilloscope 110 and the averaging meter 112, respectively. The magnitude of the dynamic velocity number due to the conjugate error of the gear teeth can then be seen, and a single velocity number will be indicated on the scale of the averaging meter 112. This will indicate the relative quietness of the gearset in comparison to the velocity number of a gearset that has been previously tested, or the velocity number of a calibrated axle gearset, to which the scale of the meter has been adjusted.

While the invention has been described in particular with respect to analyzing the noise level of a gearset so far as nonconjugate action of the gearset is concerned, it will be clear that the analyzer 108 can be adjusted to pick out any of the other harmonic orders of torsional vibration, and is not limited to analyzing just the conjugate error noise level. That is, if it were desired to analyze the fifth or tenth orders of torsional vibration, that could be, for example, the result of the eccentric mounting of the gears of the symmetrical arrangement of the mounting bolt holes, the analyzer 108 could be tuned to pick out this particular order, and the wave pattern and velocity number shown on the oscilloscope 110 and meter 112 would reflect the amplitude and frequency of this order.

It will be clear from the foregoing, therefore, that the invention provides a quick dynamic check of a nominally constant velocity ratio gearset as to its suitability for use insofar as noise level due to any cause is concerned, and that it eliminates guesswork as to whether a rear axle gearset, for example, is as satisfactory as one that is known to be quiet, or a calibrated reference rear axle gearset.

While the invention has been illustrated in its preferred embodiments in the figures, it will be clear to those skilled in the arts to which the invention pertains that many changes and modifications may be made thereto without departing from the scope of the invention.

I claim:

1. An apparatus for checking the conjugate error of a constant velocity ratio gearset comprising, a longitudinally extending rotatable shaft of relatively high stiffness adapted to support on one end thereof for rotation thereof the lower inertia one of the test gears of a constant velocity ratio gearset, a second test gear mounting means adjacent said shaft for rotatably supporting the higher inertia test gear of said gearset thereon in meshing engagement with first test gear, a drive member for driving said shaft and said one test gear, means connecting said drive member to said shaft isolating the torsional vibrations of said drive member from said shaft and one test gear, the deviations from the constant ratio of angular movement of said gears resulting from conjugate error of said gearset providing variations in angular displacement of said low inertia test gear and shaft from the relatively constant angular movement of said shaft provided by said drive member, and angular displacement differential pickup and indicating means operably connected to said shaft for rotation therewith and having means responsive to the said variations in angular displacement of said one test gear and shaft for indicating said variations.

2. An apparatus as in claim 1, including means applying a load to said high inertia test gear.

3. An apparatus as in claim 1, said pickup and indicating means including a first means secured to and rotatable with said shaft, and a second means operably connected to said first means for rotation therewith and having a limited relative movement interconnection thereto.

4. An apparatus as in claim 3, said second means having a mass greater than said first means whereby change in rate of angular movement of said first means effects a limited relative rotation between said first and second means.

5. An apparatus as in claim 1, said pickup means including strain gage means operably connected to said drive mechanism, slip ring means operably connected to said strain gage means and said shaft, and signal generating means energized by the variations in angular movement of said shaft relative to that of said drive means.

6. An apparatus as in claim 1, said pickup means comprising an electrical sensor consisting of an outer housing and an inner coil connected to and rotatable with said shaft, and a field means between said housing and coil magnetically coupled to said coil for developing a voltage proportional to the relative movement between said field and coil due to the variations in angular movement of said shaft from the relatively constant angular movement thereof provided by said drive member, said indicating means including means for sensing said voltage.

7. An apparatus for checking the conjugate error of a constant velocity ratio gearset comprising, a first longitudinally extending rotatable shaft fixedly supporting on one end thereof for rotation therewith one of the gears of a constant velocity ratio gearset, a second test gear mounting means adjacent said first shaft for rotatably supporting the other test gear of said gearset thereon in meshing engagement with the first test gear, a second longitudinally extending shaft concentrically arranged with respect to said first shaft and operably fixed to said first shaft at a location remote from the said one end, a source of power connected to said second shaft for driving said second and first shafts and one test gear substantially at a uniform rate, said second shaft being torsionally stretchable for absorbing the torsional vibrations of said power source and damping transmittal of said vibrations to said first shaft, and motion differential indicating means operably connected to said first shaft for rotation therewith and having means responsive to variations in angular displacement of said one test gear and first shaft from the uniform angular motion of said first shaft resulting from conjugate error in said gearset for indicating said variations.

8. An apparatus as in claim 7, said first shaft comprising a relatively stiff sleeve shaft telescopically surrounding said second shaft, said second shaft comprising a torsion bar.

9. An apparatus as in claim 7, said first and second shafts comprising a pair of high and low stiffness members, respectively.

10. An apparatus as in claim 7, said indicating means including strain gage means secured to said first shaft for indicating the torsional stretching of said first shaft due to variations in angular movement of the one test gear and first shaft from a uniform angular motion, and slip ring means operably connected to said second shaft and electrically connected to said strain gage means.

References Cited by the Examiner
UNITED STATES PATENTS

| | | | |
|---|---|---|---|
| 2,655,036 | 10/1953 | Chapman | 73—70.1 |
| 3,127,767 | 4/1964 | Kamp | 73—162 |
| 3,200,641 | 8/1965 | Stark | 73—116 X |

DAVID SCHONBERG, *Primary Examiner.*

LOUIS R. PRINCE, *Examiner.*

M. B. HEPPS, *Assistant Examiner.*